Jan. 2, 1968 R. O. DUNAWAY 3,360,806
COLLAPSIBLE STATION WAGON PAD
Filed March 18, 1966 3 Sheets-Sheet 1
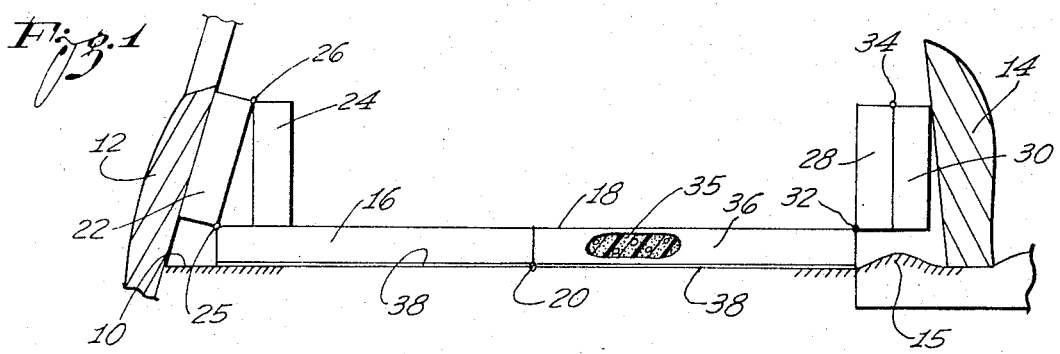
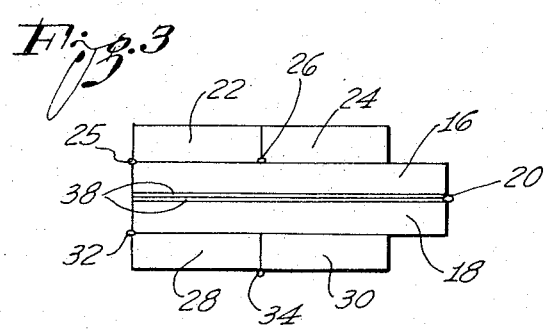
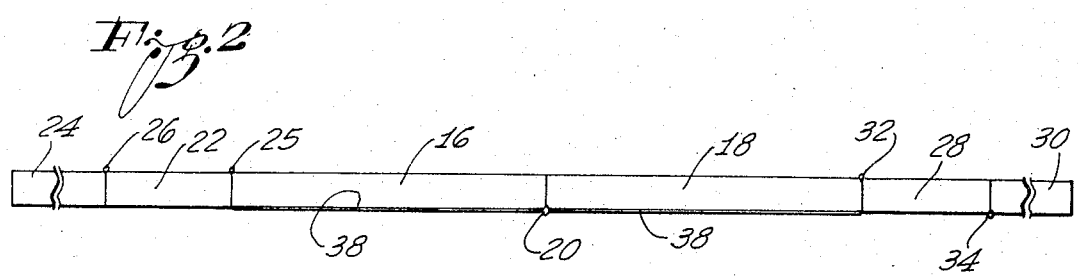
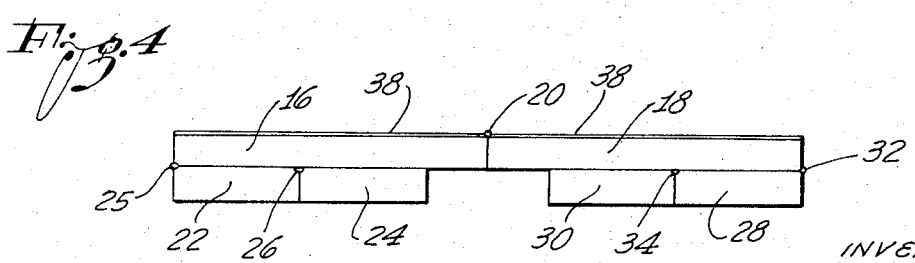
INVENTOR
RAYMOND O. DUNAWAY
ATTORNEYS

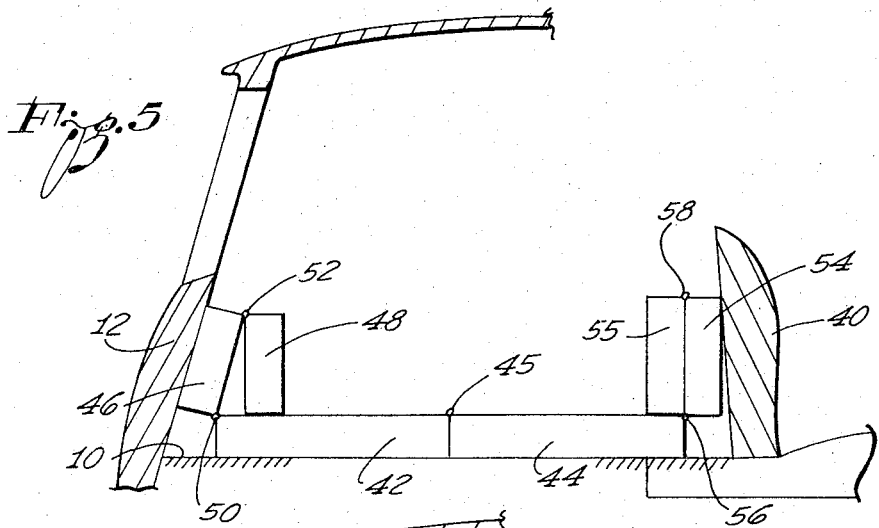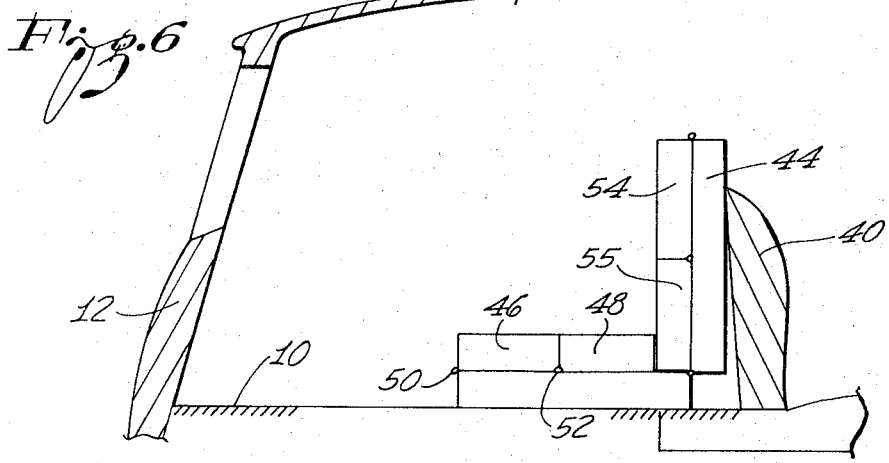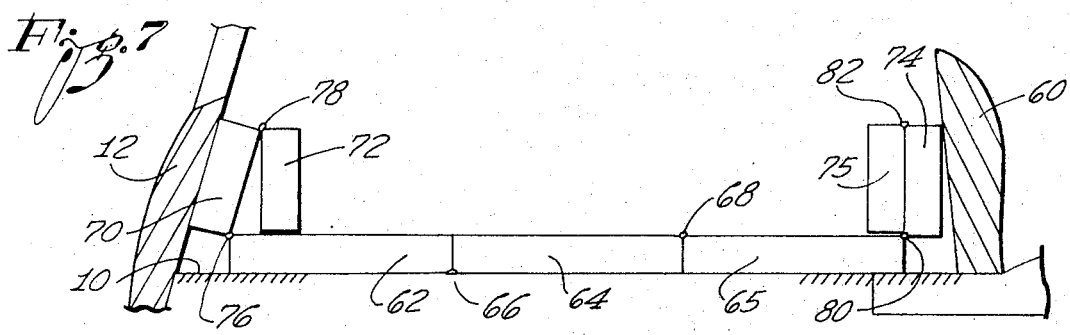

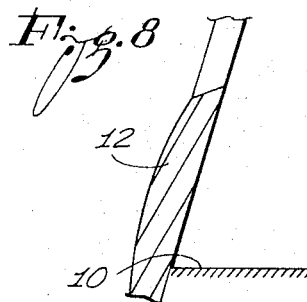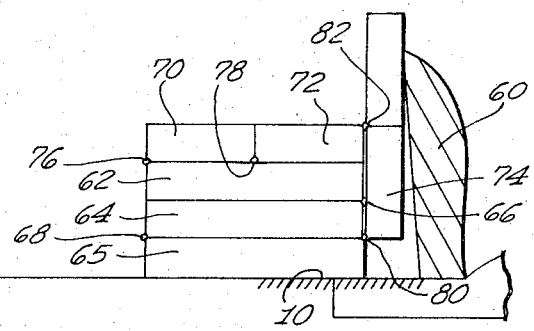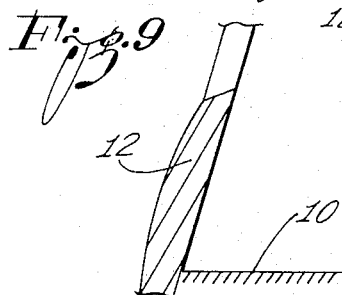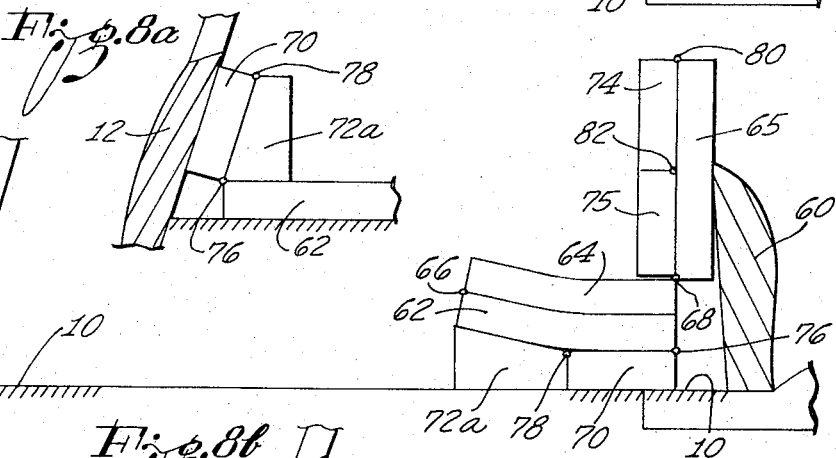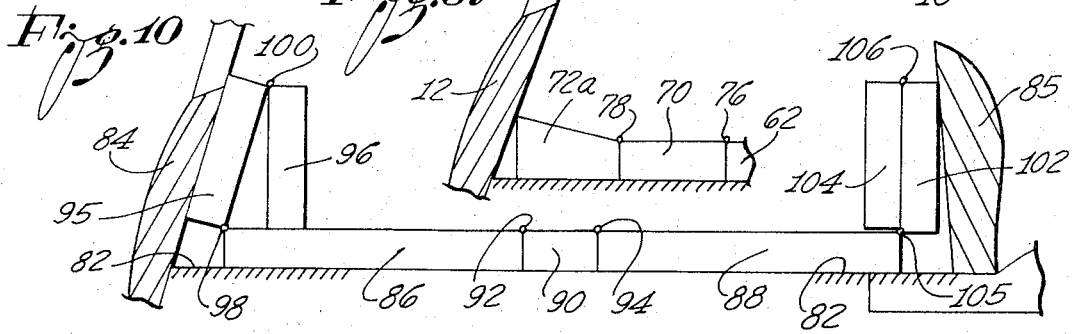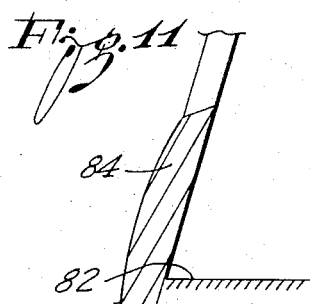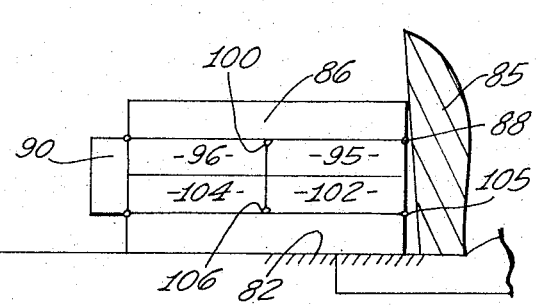

United States Patent Office 3,360,806
Patented Jan. 2, 1968

3,360,806
COLLAPSIBLE STATION WAGON PAD
Raymond O. Dunaway, 918 Natchez St.,
San Pedro, Calif. 90731
Filed Mar. 18, 1966, Ser. No. 535,511
15 Claims. (Cl. 5—357)

This invention relates to a resiliently yieldable pad to cushion a floor area of a vehicle as well as to cushion upright structure bounding the forward and rearward ends of the floor area, the primary purpose of the pad being protection against impact injuries to children riding in a station wagon or the like.

A child riding on the rear floor of a station wagon has a relatively extensive area in which to move, especially when no rear seats diminish the area. The bare floor is hard and since a child is heedless of changing driving conditions there are repeated risks that a child will be caught off balance and be tumbled rearwardly across the hard floor against the tail gate by acceleration of the vehicle or be tumbled forward against the fixed back of a seat by an abrupt deceleration of the vehicle.

The present invention cushions any impact against the floor or against upright structure that may be caused in this manner. In this regard, a feature of the invention is the provision of an upright double pad thickness to cushion forward and rearward impacts against the upright structure. Another feature is the concept of a foldable pad that may be conveniently carried and compactly stored.

The invention further teaches that such a pad may be constructed for multiple purposes. In some practices of the invention, the pad folds into a compact yieldingly resilient body which may be used for a seat in or out of the vehicle or may be used as a hassock outside of the vehicle. In some practices of the invention, moreover, the pad may be folded into a seat having an upright back portion to rest against upright structure adjacent the ends or sides of the floor area of the vehicle.

One embodiment of the invention is provided with a rigid panel on its underside, so that the pad may be reversed to place the rigid panel uppermost. With the rigid panel uppermost and with at least one layer of the pad under the panel, fragile articles that need to be cushioned against road shocks may be placed on the panel for safe transportation.

In the preferred practices of the invention, hinged end sections of the pad fold together in upright position to cushion impacts against upright structure of the vehicle. One advantage of such a construction is the provision of a double thickness of the pad to cushion the impacts. Another advantage is that with the two upright sections hinged together at their upper edges, the two sections may be spread apart at their lower edges for stability. Still another advantage is that the hinged end sections may be unfolded and positioned as flat extensions of the main body of the pad to result in a flat pad that is long enough to serve as a mattress for an adult.

The various features and advantages of the invention may be understood from the following detailed description and the accompanying drawings.

In the drawings, which are to be regarded as merely illustrative:

FIG. 1 is a diagrammatic side elevational view of one embodiment of the pad in its effective position on the rear floor area of a station wagon;

FIG. 2 is a side elevational view of the same pad in unfolded or flat state;

FIG. 3 is a side elevational view showing the same pad folded to form a compact body;

FIG. 4 is a side elevational view of the same pad folded to form a cushioned platform for fragile articles;

FIG. 5 is a view similar to FIG. 1 illustrating a second embodiment of the invention;

FIG. 6 is a side elevational view showing how the second embodiment of the invention may be folded to form a seat for use in a station wagon;

FIG. 7 is a view similar to FIG. 1 illustrating a third embodiment of the invention;

FIG. 8 is a side elevational view showing how the third embodiment may be formed into a seat for use in a station wagon;

FIG. 8a is a fragmentary elevational view showing a modification of the structure shown in FIG. 7 which modification comprises shaping an end section of the pad to a wedge-shaped configuration, the wedge-shaped end section being shown as extending upward;

FIG. 8b is a similar fragmentary elevational view showing the wedge-shaped end section lying flat in abutment with the tail gate of the station wagon;

FIG. 9 shows how a seat may be formed by a pad that is modified as indicated in FIGS. 8a and 8b;

FIG. 10 is a view similar to FIG. 1 illustrating a fourth embodiment of the invention; and FIG. 11 is a side elevation of the fourth embodiment formed into a compact body.

FIG. 1 shows a floor 10 of a station wagon with one end of the floor area bounded by a forwardly inclined tailgate 12 and with the forward end of the floor area bounded by the back of a forwardly facing seat 14. In this particular station wagon, a protuberance 15 extends slightly above floor level immediately rearward of the back of the seat 14.

The main portion of the pad, i.e. the portion that is intended to serve as a resilient cover or mattress for the floor 10 is divided into two sections 16 and 18, respectively, which are connected together by a hinge 20 that is adjacent the lower surfaces of the two sections. One end portion of the pad comprises two shorter sections 22 and 24, the section 22 being connected to the section 16 by a hinge 25 that is substantially in the plane of the upper side of the pad and the section 24 being connected to the section 22 by a hinge 26 that is on the same side of section 22.

The two sections 22 and 24 are normally turned upright as shown in FIG. 1 to provide a double pad layer to cushion impacts of a child against the tailgate 12. Since the tailgate 12 inclines forwardly, the section 22 would tend to fold back onto the section 16 but is prevented from doing so by the section 24 which serves as a prop for the section 22. It is to be noted that the two sections 22 and 24 are spread apart at their lower ends to provide stability for the two upright sections.

The forward end portion of the pad is divided into two sections 28 and 30, section 28 being connected to section 18 by a hinge 32 that is substantially at the plane of the upper surface of the pad and the section 30 being attached to the section 28 by hinge 34 that is on the opposite side of the section 28. With the two end sections 22 and 24 positioned upright adjacent the tailgate 12 as shown in FIG. 1, only the thickness of the section 22 overhangs the rear end of the main portion of the pad, but with the two end sections 28 and 30 positioned upright against the back of the seat 14, the thicknesses of both of the end sections 28 and 30 overhang the forward end of the main portion of the pad. Thus the two upright sections 28 and 30 bridge the gap between the main portion of the pad and the back of the seat 14 and both overhang and conceal the protuberance 15. Either of the two hinge arrangements of the two end sections of the pad may be employed at either end of the pad in various embodiments of the invention.

Within the scope of the invention, the various sections of the pad may be fabricated in any suitable manner and the various hinges may be provided in any suitable manner. In the presently preferred practice of the invention each of the various sections of the pad comprises a suitably thick layer of foamed plastic, for example cellular urethane enclosed by fabric. In the construction shown, each section comprises a body 35 of cellular urethane enclosed in a fabric casing 36 and each of the various hinges is made of two layers of the fabric.

A feature of the first embodiment of the invention is that the bottom surfaces of the two sections 16 and 18 of the main portion of the pad are covered with rigid panels 38. The panels 38 may be made, for example, of thin fiberboard, thin plywood or "Masonite."

FIG. 2 shows how the pad shown in FIG. 1 may be unfolded to lie flat as an extensive mattress long enough for use by an adult. FIG. 3 shows how the pad may be folded into a compact mass or body for storage or transportation. Such a compact body may be easily carried from the station wagon to a picnic area. It is also to be noted that the compact body shown in FIG. 3 may be used as a seat or as a hassock.

FIG. 4 shows how the pad shown in FIG. 1 may be turned upside down with the end sections 22 and 24 folded under the section 16 and with the sections 28 and 30 folded under section 18. With the rigid panels 38 uppermost, the folded pad forms a cushioned platform to carry fragile articles and to protect the articles against road shocks.

The second embodiment of the invention illustrated by FIG. 5 is shown as positioned on the floor of a station wagon wherein the back 40 of a seat rises directly from the floor level without a previously described protuberance adjacent the seat. The main portion of the pad comprises two sections 42 and 44 interconnected by a fabric hinge 45 which is adjacent the plane of the upper surface of the pad instead of being adjacent the plane of the lower surface.

The rear end portion of the pad comprises two relatively short sections 46 and 48 which are similar to corresponding end sections of the first embodiment of the invention. Thus section 46 is connected to section 42 by a hinge 50 that is substantially flush with the upper surfaces of the pad and the section 48 is connected to the section 45 by a hinge 52 that is adjacent to the same side or face of section 46. At the front end of the pad, two relatively short end sections 54 and 55 are similar to end sections 46 and 48, the end section 54 being connected to section 44 by a hinge 56 adjacent the upper face of the pad and the section 55 being connected to section 54 by a hinge 58 which is adjacent the same face of section 54.

FIG. 6 shows how the pad shown in FIG. 5 may be formed into a seat for use on the floor of the station wagon, the seat having two layers for a person to sit on and having a two layer back. It is to be noted that the combined length of the sections 54 and 55 is somewhat shorter than the length of the section 44 to permit the pad to assume the configuration shown in FIG. 6.

FIG. 7 shows a third embodiment of the invention for cushioning a floor 10 between a tailgate 12 and the back 60 of a forwardly facing seat. The main portion of the pad comprises three sections 62, 64 and 65, the section 62 being connected to the section 64 by a fabric hinge 66 adjacent the underside of the pad and the section 64 being connected to the section 65 by hinge 68 adjacent the upper side of the pad. The rear end portion of the pad comprises two sections 70 and 72 which correspond to sections 46 and 48 of FIG. 5, and the forward end portion of the pad likewise comprises two sections 74 and 75 which are similar to sections 54 and 55 of FIG. 5. Thus end section 70 is connected to section 62 by hinge 76; section 72 is connected to section 70 by hinge 78; section 74 is connected to section 65 by hinge 80; and section 75 is connected to section 74 by hinge 82, the four hinges being adjacent the upper side of the pad.

FIG. 8 shows how the pad shown in FIG. 7 may be folded to form a four layer seat for use in the station wagon or elsewhere, the seat having a single layer back to rest against the seat back 60 or some other upright fixed structure.

FIG. 8a shows how the pad that is illustrated by FIG. 7 may be modified by changing the configuration of the end section 72. In FIG. 8a the end section 72a is of wedge-shaped configuration to fit snugly against the adjacent upright section 70. Thus the wedge-shaped configuration of section 72a provides a solid end construction with no air gap between the two upright end sections and with resulting stability of the two upright end sections.

When the forwardly facing seat 60 in FIG. 7 is folded down to increase the length of the floor of the station wagon, the pad shown in FIG. 7 may be stretched out flat to form a mattress of ample length for covering the whole floor area. If the pad is provided with the above mentioned wedge-shaped end section 72a, the end section 72a will abut the tail gate 12 in the manner shown in FIG. 8b. One advantage is that the inclination of the wedge-shaped end section 72a tends to keep objects from rolling against the end gate. Another advantage is that the increased thickness of the section 72a provides a pillow section for the mattress.

FIG. 9 shows how the pad modified as shown in FIG. 8a may be formed into a three layer seat with a two layer back. It will be noted that the seat portion desirably inclines downwardly and rearwardly towards the back portion of the seat.

FIG. 10 shows a fourth embodiment of the invention mounted on a floor 82 between a tailgate 84 and the back 85 of a forwardly facing seat. The main portion of the pad comprises two relatively long sections 86 and 88 interconnected by a relatively short middle section 90, the three sections being interconnected by hinges 92 and 94 adjacent the upper side of the pad.

The rear end portion of the pad comprises two sections 95 and 96 with the section 95 connected to the section 86 by a hinge 98 and with the section 96 connected to the section 95 by a hinge 100. In like manner, the forward end portion of the pad comprises two relatively short sections 102 and 104, the section 102 being connected to the section 88 by hinge 105, the section 102 being connected to the section 104 by hinge 106. All four of the hinges 88, 100, 105 and 106 are adjacent the upper surface of the pad.

The advantage of the pad construction shown in FIG. 10 is that the pad will cover a relatively long floor area but may be folded into compact form for storage or to serve as a seat. FIG. 11 shows how the pad may be folded compactly into four layers for this purpose.

It is apparent that all of the embodiments of the invention serve the basic purpose of providing a cushioned area in a station wagon where children and/or pets may ride with protection against damaging impacts. If the station wagon is suddenly accelerated to cause the child to tumble rearward, a double layer of padding cushions any impact against the rear tailgate. On the other hand if an abrupt stop is made, two upright layers of the pad provide protection against impact against the back of the forwardly facing seat.

My description in specific detail of the selected embodiments of the invention will suggest various changes, substitutions and other departures from my disclosure within the spirit and scope of the appended claims.

I claim:

1. A protective device for protecting a child on a floor area of an automotive vehicle against impact wherein the floor area is bounded by forward and rearward upright structure, said protective device comprising:

a protective cushioning pad having a main portion to cover the floor area of the automotive vehicle and two end portions hingedly connected to said main portion adjacent the ends thereof to extend upwardly against said forward and rearward structure, respectively; and each of said end portions being at least approximately twice as thick as the main portion to provide a substantial cushion against impact.

2. A pad as set forth in claim 1 in which each end portion comprises two hingedly interconnected end sections folded together whereby each end portion may be unfolded to form a flat extension of the main portion.

3. A pad as set forth in claim 2 in which the endmost of the two hingedly interconnected end sections is of wedge-shape with the thicker portion of the wedge-shape at the end of the pad.

4. A pad as set forth in claim 2 in which said main portion comprises a plurality of hingedly interconnected sections to permit the main portion to be folded, each of the sections of the main portion being substantially longer than the sections of the end portions.

5. A pad as set forth in claim 4 in which each of the sections of the main portion is at least approximately twice as long as the sections of the end portions to permit the pad to be folded into a compact multiple-layer body, each section of the main portion forming a layer of the compact body and at least one layer of the compact body being formed by two end sections positioned end to end.

6. A pad as set forth in claim 4 in which the main portion has two sections of substantially equal length.

7. A pad as set forth in claim 4 in which the main portion has three sections of substantially equal length.

8. A pad as set forth in claim 4 in which the hinges connecting the successive sections are located to permit the pad to be folded into a compact body.

9. A pad as set forth in claim 4 in which the hinges interconnecting the successive sections are located to permit the pad to be folded into a configuration forming a seat and a back for the seat.

10. A pad as set forth in claim 2 in which with the two sections of one of said end portions unfolded to lie flat as an extension of the main body portion, the hinge connection between the main portion and said one end portion is adjacent the upper face of the pad and the hinge connection between the two end sections of said one end portion is adjacent the lower face of the pad.

11. A pad as set forth in claim 10 in which the endmost section of said two end sections is wedge-shaped whereby the wedge-shaped section effectively braces the adjacent end section when the two end sections are folded together and swung upright and whereby the wedge-shaped end section has an upper surface that inclines upward when the whole pad is unfolded to lie flat to serve as a mattress.

12. A pad as set forth in claim 2 in which with the two end sections of one of said end portions unfolded to lie flat as an extension of the main body portion, the hinge connection between the main portion and said one end portion is adjacent the upper face of the pad and the hinge connection between the two end sections of said one end portion is also adjacent the upper face of the pad, whereby when the two sections of said one end portion are folded together and swung upright, one of the upright sections overlaps the main portion and the other upright section overhangs the corresponding end of the main portion.

13. A pad as set forth in claim 2 in which said main portion has a stiff bottom layer and said end portions may be folded over onto the main portion, whereby with the end portions folded onto the main portion to form a double layer pad, the double layer pad may be reversed to place the stiff bottom layer uppermost to serve as a cushioned platform.

14. A pad as set forth in claim 2 in which the main portion comprises two relatively long sections and an intermediate relatively short section, the hinges interconnecting the successive sections being located to permit the pad to be folded into a compact multiple layer body.

15. A pad as set forth in claim 1 in which at least one of said two end portions comprises two upright sections with their upper edges hinged together and both extending downward from their interconnecting hinge, the two end portions being hingedly connected to the main portion at the upper edge of the main portion whereby the two sections may be spread apart at their lower edges to stabilize the two upright sections with one of the two sections extending upward along one of said upright structures and with the other of the two sections resting at its end on the main portion of the pad in position to prop up said one of the two sections.

References Cited
UNITED STATES PATENTS

| | | | |
|---|---|---|---|
| 132,686 | 10/1872 | Pack et al. | 5—357 |
| 2,170,382 | 8/1939 | Kiesler | 5—58 |
| 2,528,768 | 11/1950 | Marsh | 5—344 |
| 2,589,579 | 3/1952 | Slayen | 5—357 |
| 2,709,478 | 5/1955 | Golding et al. | 5—94 |
| 2,857,957 | 10/1958 | Gay | 5—344 |
| 3,205,010 | 9/1965 | Schick | 297—231 |
| 3,284,819 | 11/1966 | Nissen | 5—344 |

FOREIGN PATENTS

| | | |
|---|---|---|
| 3,311 | 2/1906 | Great Britain. |
| 7,786 | 3/1908 | Great Britain. |

CASMIR A. NUNBERG, *Primary Examiner.*